United States Patent [19]
Grube

[11] 3,999,659
[45] Dec. 28, 1976

[54] PIERCE NUTS IN STRIP FORM

[75] Inventor: William L. Grube, Lake Bluff, Ill.

[73] Assignee: MacLean-Fogg Lock Nut Company, Mundelein, Ill.

[22] Filed: Dec. 10, 1973

[21] Appl. No.: 423,188

Related U.S. Application Data

[60] Continuation of Ser. No. 243,886, April 13, 1972, abandoned, which is a division of Ser. No. 21,777, March 23, 1970, Pat. No. 3,704,507.

[52] U.S. Cl. .............................. 206/343; 206/820
[51] Int. Cl.² ....................................... B65D 69/00
[58] Field of Search .................. 206/343, 390, 820; 85/32 R, 34; 29/193.5

[56] References Cited

UNITED STATES PATENTS

| | | | |
|---|---|---|---|
| 833,187 | 10/1906 | Ward | 85/34 R |
| 2,221,961 | 11/1940 | Allen et al. | 85/32 R UX |
| 3,117,610 | 1/1964 | Matthews | 206/509 UX |
| 3,140,010 | 7/1964 | Double | 29/432 UX |
| 3,152,628 | 10/1964 | Strain et al. | 151/41.73 |
| 3,165,968 | 1/1965 | Anstett | 206/343 |
| 3,177,915 | 4/1965 | La Fleur et al. | 85/32 R X |
| 3,241,658 | 3/1966 | Anderson | 206/820 |

FOREIGN PATENTS OR APPLICATIONS

| | | | |
|---|---|---|---|
| 1,468,182 | 12/1966 | France | 206/820 |

*Primary Examiner*—Leonard Summer

[57] ABSTRACT

Pierce nuts are provided in finished form as similarly oriented and spaced parts of a strip, held together by metallic connectors which are sufficiently flexible to permit coiling the strip for purposes of feeding the pierce nuts in an uninterrupted and predictable sequence severing and applying the end nut of the strip to a panel. In a preferred form flanged pierce nuts are completely formed from a rigid metal bar having laterally extending flanges of reduced thickness on opposite sides of the bar, the nuts being separated by slots extending across the strip into the flanges to reduce the cross-section of the connecting material and thus impart flexibility to it. The strip is sufficiently rigid in a longitudinal direction to permit pushing the strip into the severing and applying tool.

7 Claims, 13 Drawing Figures

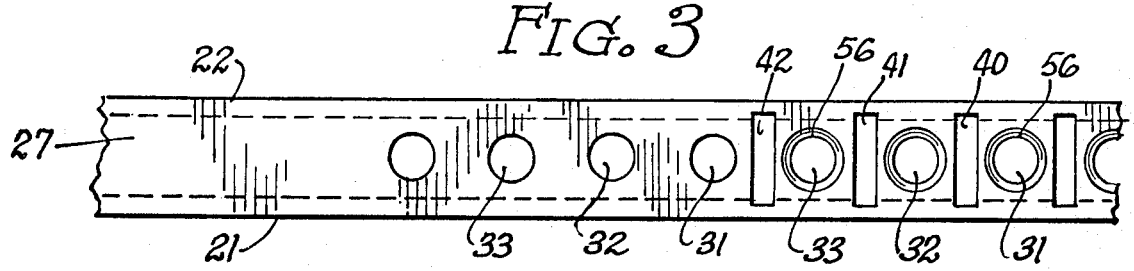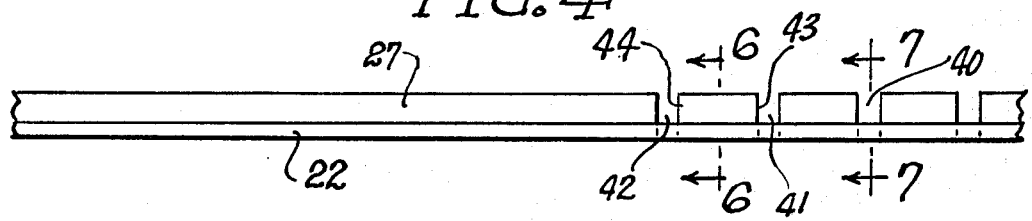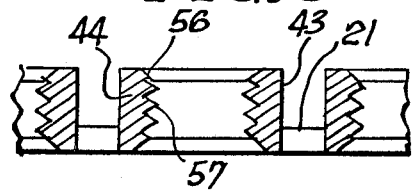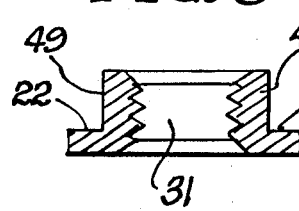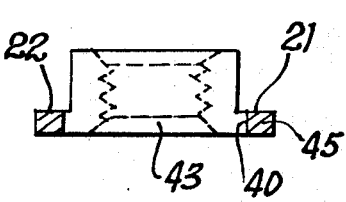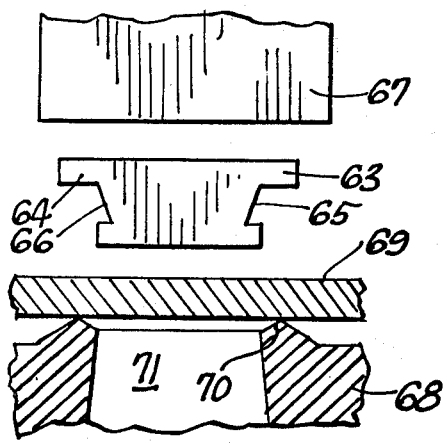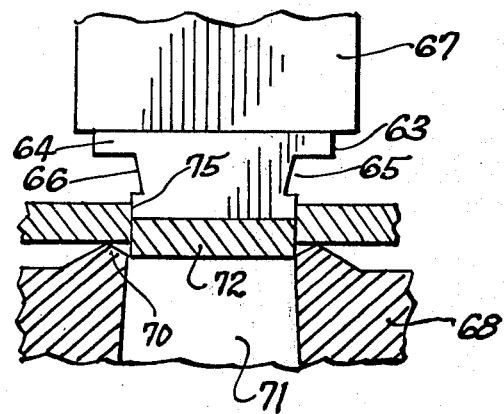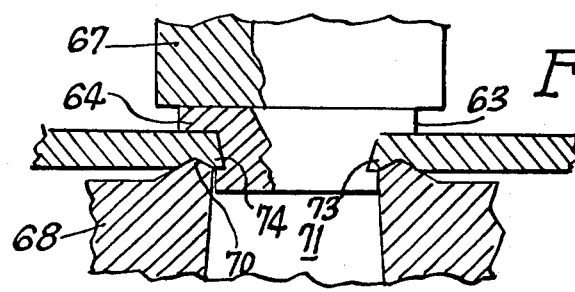

PIERCE NUTS IN STRIP FORM

This is a continuation of my application for patent filed Apr. 13, 1972, Ser. No. 243,886, now abandoned which is a division of my application for patent filed Mar. 23, 1970, Ser. No. 21,777, now U.S. Pat. No. 3,704,507 granted Dec. 5, 1972.

This invention relates to pierce nuts connected together in strip form for ready and certain application of such nuts to a panel. Pierce nuts are nuts used as punches to form openings for themselves in a panel to which they are rigidly secured as part of the punching operation.

At present the use of pierce nuts is limited to extremely high volume applications. The pierce nuts are formed individually and then dumped into a vibrating hopper which selects, orients and discharges individual nuts into a chute from which they are fed by gravity to a tool in a punch press which applies them to a panel. The special hopper and associated chute are individually designed for each panel and are expensive to make and set up. Furthermore, existing systems for handling pierce nuts are highly specialized in the sense that the entire system of feeding, selecting and applying the nuts must be custom designed for each application inasmuch as the form of the panel and the location of the pierce nut on the panel vary in each instance.

It is an object of this invention to provide a plurality of pierce nuts as a series of connected nuts forming a strip which may be coiled at the point of manufacture of the nuts, and then shipped in coil form to a punch press at the point of use where they are individually severed from the coil and simultaneously applied to a panel.

As a more specific object, this invention has within its preview the provision of similarly oriented completely formed pierce nuts held in spaced relation to one another by flexible metallic connectors to form a strip which may be coiled and by which they may be fed to a punch press for individual separation and application to a panel.

A further specific object of this invention is the provision of a strip of metal of a thickness corresponding to the axial dimension of a pierce nut, the strip having laterally extending parallel flanges of reduced thickness, the strip being transversely slotted to create individual projections which are centrally punched and tapped to form complete pierce nuts, the slots extending into the flanges to leave connectors which may be bent, and which hold the completed nuts in fixed spaced relative to one another for cooperation with a feed mechanism.

These and other objects of this invention will become apparent from the following detailed description of preferred embodiments of the novel strip of connected nuts, the method of forming the strip and the method of applying the nuts to a panel, all of which are depicted in the accompanying drawings in which:

FIGS. 3 and 4 are respectively bottom and side views of the strip of FIG. 2;

FIG. 5 is an enlarged side elevation in section of a fragment of the strip of FIG. 2 taken along line 5—5 of FIG. 2;

Figure 2:
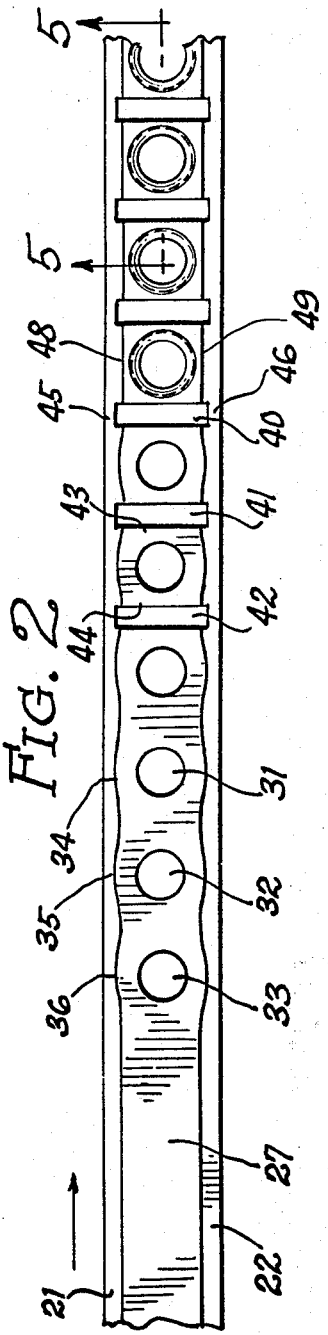
FIG. 2 is a plan view of the strip showing its progressive transformation by the steps in the method of this invention.
Figure 11:
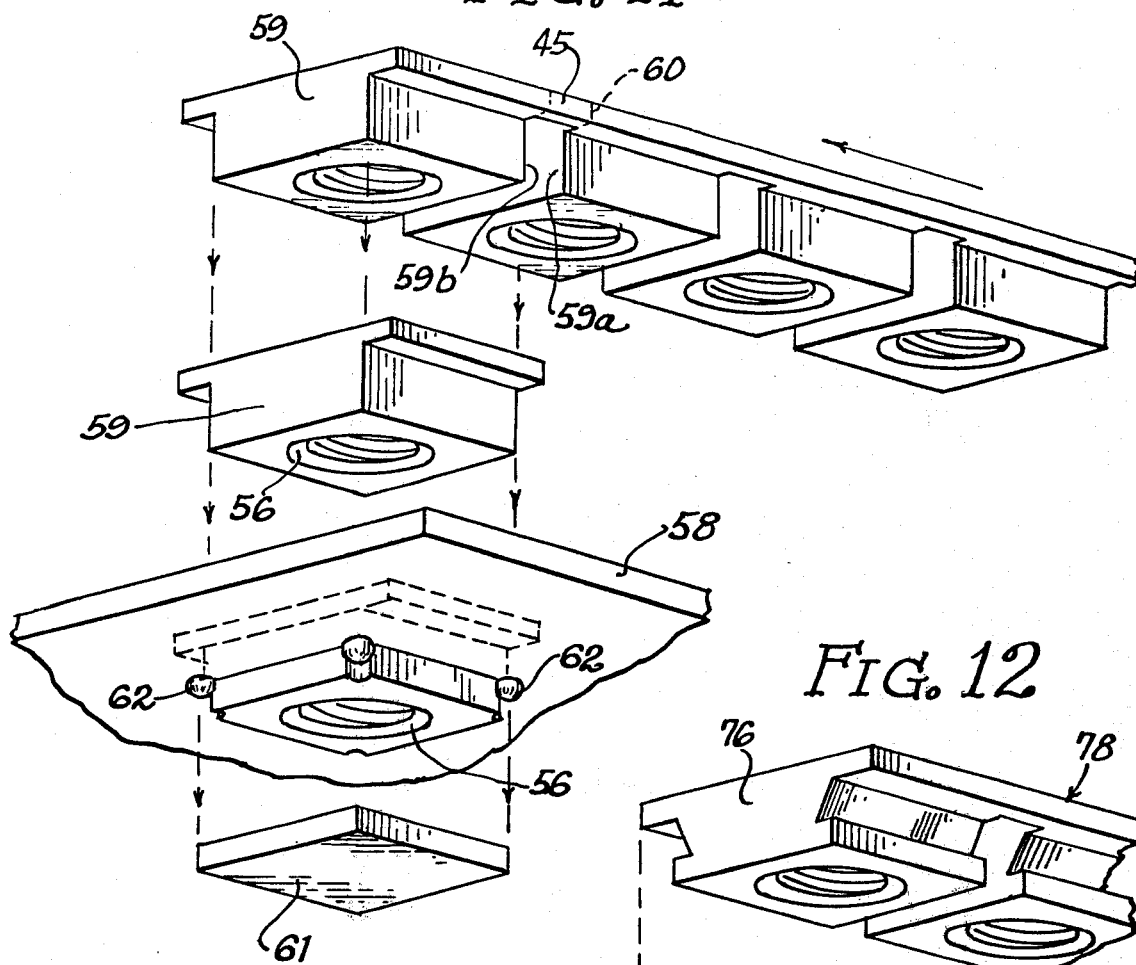
Figure 12:
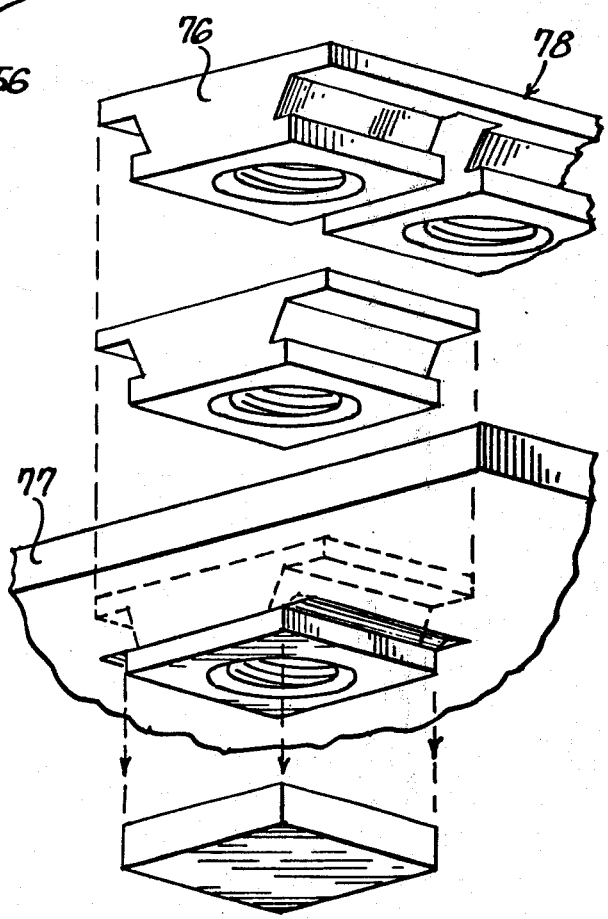

FIGS. 6 and 7 are enlarged transverse sections of the strip taken along lines 6—6 and 7—7 of FIG. 4;

FIGS. 8, 9 and 10 are enlarged fragmentary elevations in sections of a modified form of pierce nut, the figures showing three sequential steps in the application of such nut to a panel;

FIG. 11 is a bottom view in perspective showing the steps in applying the pierce nut of FIG. 2 to a panel; and FIG. 12 is a bottom view in perspective showing the steps in applying the modified form of pierce nut of FIGS. 8, 9 and 10 to a panel.

The general objectives of this invention are attained by forming nuts in a punch press from strip stock having a predetermined rolled section but instead of shearing the nuts completely from the strip at the end of the forming operation, the strip is merely perforated between the nuts in such a manner as to leave a thin web of material between the nuts. The web will be durable enough to make it possible for the strip to be coiled into a roll and thereafter shipped and handled as a finished product. The rolls of nuts may thus be sold and transported to customers as correctly oriented and precisely located nuts for use with a tool which feeds the nuts from the coil, one at a time to a die for further processing. The latter may, for example, locate the nut on a panel to which it is to be attached, sever it from the strip, pierce the panel with it and clinch the nut to the panel.

The initial rolled section may be purchased from a mill to have the precise cross sectional profile and metallurgy desired, but it is also possible for the nut manufacturer to provide tooling for shaping the initial rolled section to have the cross section he desires.

Figure 1:
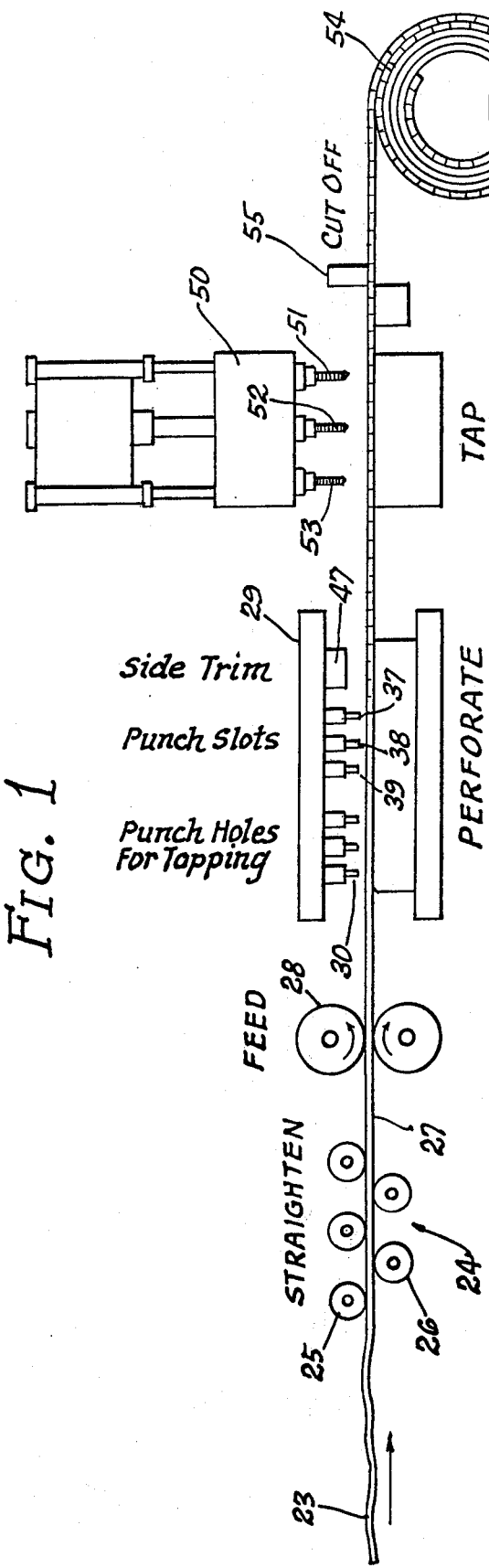
FIG. 1 is a schematic diagram of the sequence of steps performed upon a strip of metal to produce a coil of connected pierce nuts.
Figure 2A:
FIG. 2a is a cross section through the strip in its original form.

Referring now to FIGS. 1 and 2 for a detailed description of the invention, the material from which the nuts are made is shown as a strip of steel having the desired physical characteristics purchased in coil form from a steel mill which has rolled or otherwise produced a predetermined initial cross section in the strip. The fastener selected to illustrate this invention is a pierce nut which is flanged on two of its opposed sides, the flanges acting as abutments when the nut is installed on a panel to resist pulling the nut through the panel. Accordingly, as shown in FIG. 2a, the contour of the starting material is generally rectangular, as shown at 20, with flanges 21 and 22 formed on opposite sides of the rectangular section. The starting material may be supplied in coil form, and when pulled from its initial coil, the strip containing the section shown in FIG. 2 may be somewhat bent, as shown at 23 in FIG. 1. The first operation, therefore, to be performed on the strip is a straightening operation. This is shown at 24 of FIG. 1, the strip straightener comprises a series of staggered rolls 25, 26 from which the strip, designated 27, is passed to a pair of feed rolls 28.

From the feed rolls, the strip 27 is advanced to a punch press at which may be set up a progressive die 29, the first operation in which is a perforating operation. It is contemplated that several nuts will be formed simultaneously and accordingly three cylindrical punches 30 are provided at this station said punches creating three spaced round holes 31, 32 and 33 in the strip 27. The creation of holes 31, 32 and 33 is accompanied by a spreading of the material of the strip 27 laterally to form bulges 34, 35 and 36 on both sides of strip 27.

The next operation performed by progressive die 29 is a slotting operation which not only forms the remaining two sides of the finished nut but removes enough material from between adjacent nuts to leave only a part of each flange 21, 22 to connect adjacent nuts together. Thus, die 29 is provided wth punches 37, 38 and 39 which are of elongate rectangular cross section and form the slots 40, 41 and 42, respectively. It may be noted that said slots extend into the flanges 21 and 22 so that the sides 43 and 44 of a nut are completely formed, while at the same time the flanges 21 and 22 have been reduced in width to form relatively thin but durable connecting sections 45 and 46 between adjacent nuts.

The third operation performed by progressive die 29 is a side trimming operation designed to remove the bulges 34, 35 and 36 from the nuts. The side trimming punch is shown at 47 and comprises a simple straight-sided punch which shaves the material of the bulges off the sides and coins it into the flanges 21 and 22. This operation finishes off the other two straight sides 48 and 49 of the nut.

Generally accepted design practice for nuts requires that the holes be countersunk to at least the root diameter of the threads to facilitate starting the screw or bolt into the nut. A countersinking operation may be incorporated in the side trimming operation of the progressive die 29. The countersinking may be performed as a coining operation by the upper part of the trimming die, pins (not shown) on said upper part entering the perforations to locate the strip correctly relative to the trimming die while at the same time forming the countersink. FIG. 5 shows the countersink 56 of one hole 33 as an example.

From die 29, the strip is moved into a tapping machine shown at 50 which may be designed to tap a plurality of holes simultaneously. Because of the lateral space required for each tapping unit, the holes tapped simultaneously may not be adjacent one another, but the first tap 51 will tap the first hole of one plural-hole unit operated on by die 29, the second tap 52 will tap the second hole of the adjacent plural-hole unit, and the third tap 53 will tap the third hole of the third adjacent plural-hole unit.

From the tapper 50 the strip 27 is coiled upon a suitable mandrel (not shown) to form a coil 54 containing a predetermined number of nuts. The coil is then severed from the strip by a cut-off die 55 and is ready for shipment to a customer who will apply the nuts individually to a panel in a suitable manner and with the aid of suitable tools and dies. During the coiling process, the strip is bent at the connecting sections 45 and 46 so that the nut portion bounded by the sides 43, 44, 48 and 49 is not in any manner distorted to impair its usefulness as a fastener.

FIGS. 5, 6 and 7 show sections through the strip 27 after the holes have been tapped and the strip is ready for coiling. Each of the holes has threads 57 cut thereinto, so that the nut is complete with the side flanges 21 and 22 required for pierce nuts, and the connecting sections between nuts, as shown in FIG. 7, are reduced to only that cross section which is determined to be necessary to permit handling the nuts as a strip. Obviously, the amount of material left in the sections 45 can be varied by appropriately lengthening or shortening the punches 37, 38 and 39 to remove more or less of the flanges 21 and 22.

Referring now to FIG. 11, the manner in which the nuts are applied to a panel 58 will now be described. Said nuts are moved to the left, as viewed in FIG. 11, in the strip form into an appropriate die which severs a nut 59 from the strip at a line shown dotted at 60 and which is merely an extension of the transverse wall 59 of the nut. In the same operation, the connecting segment 45 may also be removed to leave a clean wall 60 on the opposite side of said nut. Where the nut will be concealed in the final installation of the panel to which it is attached, the connecting segment may be left on the nut since it in no way hinders the piercing or clinching operation to be performed on the nut. The severed nut is then operated upon by a suitable punch such as that shown at 67 in FIG. 8 and advanced by said punch through the panel 58 and upon an appropriate die. Said die causes nut 59 to pierce panel 58 and remove therefrom a substantially rectangular slug 61, while at the same time forming in the corners of the protruding nut, shaved or upset metal 62, as shown in FIG. 11, which bears against the bottom surface of panel 58 to clinch nut 59 to said panel. It is understood that suitable locating means will be provided (not shown) for the nut 59 and panel 58.

Although this invention has been described with reference to clinch nuts which have flat sides parallel to the axis of the nut for use with the piercing and clinching method disclosed in my aforesaid copending application, the method is also applicable with modifications to pierce nuts which depend upon an inwardly directed movement of the panel material toward the sides of the nut for a clinching action.

One such modification is shown in FIGS. 8, 9 and 10 from which it may be observed that the nut is of substantially the same size and proportion and made from substantially the same strip of metal as the nut of FIGS. 2-7, except that the sides adjacent the flanges 63, 64 have been undercut, as shown at 65 and 66 in FIG. 8. In that Figure, a suitable punch 67 and die 68 are used, the latter being adapted to move the material of the panel 69 inwardly into the undercut 65 and 66 to clinch the nut to the panel 69. Thus, die 68 has a tapered bead 70 formed on each side of an opening 71 therein upon which panel 69 initially rests.

The first stage in the operation of the die of FIG. 8 is shown in FIG. 9 and comprises displacing a slug 72 from the central regions of the die 68. The final operation is shown in FIG. 10 and comprises displacing material 73 and 74 from the sides of the opening 75 (FIG. 9) in the panel inwardly of the nut into the undercuts 65 and 66.

FIG. 12 shows a nut 76 on the end of a strip formed with undercut sides as it is applied to panel 77 in accordance with the dies shown in FIGS. 8, 9 and 10. It may be apparent that the method of forming a strip 78 of connected undercut nuts 76 is substantially identical with that disclosed in connection with the straight-sided nuts of FIG. 2, except that the punch 47 is omitted and special grinders (not shown) or other surface shaping tools are substituted for punch 47 to remove the bulges formed in the perforating operation.

It may thus be observed that by forming pierce nuts as readily severable parts of a strip, the usual nut orienting, selecting and feeding operations are completely eliminated and the handling of the nuts can be effected without the use of containers. Furthermore, in the application of the nuts to a panel from a strip, it is possible in one stroke of a press to sever a nut from a strip, pierce a panel with the nut and clinch the nut to the panel.

I claim:

1. An article of manufacture comprising a coil of threaded pierce nuts, each nut having a rigid apertured pilot portion for piercing an opening in a rigid panel, an elongate spiral thread in the aperture of the pilot portion, the pierce nut and aperture being of an axial length to accommodate at least two turns of said thread, and flexible severable metallic connecting means adjoining adjacent pierce nuts of said coil and forming a strip of separated, aligned and similarly oriented pierce nuts which is flexible in the direction of a plane extending through the axes of the threaded apertures and resistant to flexure in a direction lateral to that plane to facilitate uncoiling the strip for subsequent feeding in flat form to a pierce nut applying station.

2. As an article of manufacture, a supply of pierce nuts comprising a strip of separated, aligned, similarly oriented and like polygonal pierce nuts, each nut comprising a central portion of rigid material having a threaded opening in the longitudinal and lateral midregion thereof and rigid flanges of lesser thickness than the rigid central threaded portion extending laterally from opposite sides of said central portion, each said central portion above the flanges comprising the pilot portion of a pierce nut for piercing an opening for a nut in a panel, the rigid central portions of adjacent nuts having opposed spaced plane surfaces substantially coextensive with the thickness dimension of said central portion and adjoined by severable metallic connecting means which is flexible in the direction of a plane extending through the axes of said threaded openings and resistant to flexure in a direction lateral to said plane, whereby to facilitate forming said strip into a coil of substantially complete and connected nuts.

3. An article of manufacture as defined in claim 2, and wherein said severable metallic connecting means comprises a plurality of flexible metallic elements spaced apart from one another laterally of the strip and disposed adjacent the surface of said pierce nut remote from the pilot portion thereof.

4. As an article of manufacture a strip of metal having a rigid central region, said strip having flanges of lesser thickness than the thickness of the central region extending laterally from opposite sides thereof, said strip having transverse slots extending from one flange to the other flange across the central region, leaving substantially rectangular projections between adjacent slots the walls of the slots comprising side surfaces of the projections, each projection forming the panel piercing pilot portion of a pierce nut and having a hole formed with multiple turns of a thread extending therethrough.

5. As an article of manufacture, a strip of metal having a rigid central region of a thickness corresponding to the axial dimension of a plurality of turns of a thread, said strip having flanges of lesser thickness than the thickness of the central region extending laterally from opposite sides thereof, said strip having transverse slots extending from one flange to the other flange across the central region, leaving flexible substantially rectangular projections between adjacent slots, the walls of the slots comprising side surfaces of the projections, each projection having a threaded hole extending therethrough and forming the panel piercing pilot portion of a pierce nut, said slots extending into said flanges to leave reduced sections in said flanges between said projections for ready severence of said projections from said strip.

6. As an article of manufacture, a strip of metal having flanges extending laterally from opposite sides thereof, said strip having transverse slots extending from one flange to the other flange, leaving substantially rectangular projections between adjacent slots, said slots extending into said flanges to leave flexible reduced sections in said flanges between said projections for ready bending and severance of said projections from said strip, each said projection having a threaded hole extending therethrough, and each said projection with its threaded hole forming a substantially complete threaded fastener, said strip being in the form of a coil bent at the flexible reduced sections in said flanges at the ends of said slots.

7. As an article of manufacture, a strip of metal having flanges extending laterally from opposite sides thereof, said strip having transverse slots extending from one flange to the other flange, leaving substantially rectangular projections between adjacent slots, each said projection having a threaded hole extending therethrough, to form a nut, said slots extending into said flanges to form reduced sections in said flanges between said projections for ready severance of said projections from said strip, said strip being in the form of a coil bent at the flanges at the the ends of said slots.

* * * * *